United States Patent [19]

Higgins et al.

[11] Patent Number: 5,198,832
[45] Date of Patent: Mar. 30, 1993

[54] FOLDABLE REFLECTOR

[75] Inventors: Glenn F. Higgins; Douglas L. Toth, both of St. Cloud, Fla.

[73] Assignee: Comtech Antenna Systems, Inc., St. Cloud, Fla.

[21] Appl. No.: 807,079

[22] Filed: Dec. 13, 1991

[51] Int. Cl.⁵ ............................................. H01Q 15/20
[52] U.S. Cl. .................................... 343/915; 343/916
[58] Field of Search ................ 343/915, 916, 897, 912

[56] References Cited

U.S. PATENT DOCUMENTS

| 1,193 | 6/1839 | Barnhurst | 135/43 |
|---|---|---|---|
| 2,113,118 | 4/1938 | Pyatt | 135/4 |
| 2,945,234 | 7/1960 | Driscoll | 343/915 |
| 3,174,397 | 3/1965 | Sanborn | 343/915 |
| 3,176,303 | 3/1965 | Holland | 343/915 |
| 3,286,270 | 11/1966 | Kelly | 343/915 |
| 3,360,798 | 12/1967 | Webb | 343/915 |
| 3,521,290 | 7/1970 | Bahiman et al. | 343/915 |
| 3,699,576 | 10/1972 | Hoyer | 343/915 |
| 3,715,760 | 2/1973 | Palmer | 343/915 |
| 4,527,166 | 7/1985 | Luly | 343/915 |
| 4,608,571 | 8/1986 | Luly | 343/781 |
| 4,683,475 | 7/1987 | Luly | 343/915 |

Primary Examiner—Rolf Hille
Assistant Examiner—Hoanganh Le
Attorney, Agent, or Firm—Brumbaugh, Graves, Donohue & Raymond

[57] ABSTRACT

A foldable reflector which includes a plurality of rib assemblies mounted around a base. The axes around which the ribs assemblies pivot lie in substantially the same plane. Each rib assembly has a rib portion and an offset member. The rib portions, which deploy flexible reflective material, lie substantially forward of the plane in both open and closed positions. The offset member have attachment points which extend to the forward side of the plane when the rib assemblies are in the closed position, and to the back side when they are in the open position. Elastic means extending between the attachment points of adjacent offset members bi-stably hold the rib assemblies in both the open and closed positions. A lock plate with radially extending portions locks the rib assemblies in the open positions when the lock plate is rotated to a position wherein the radially extending portions obstruct the pivoting of the ribs.

18 Claims, 5 Drawing Sheets

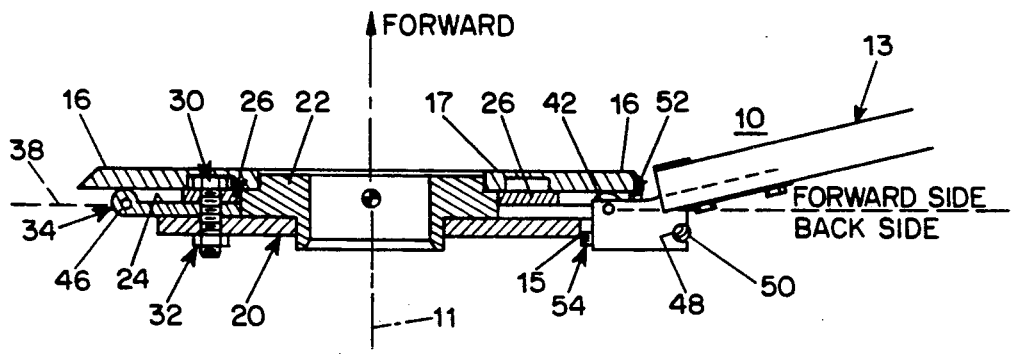

FOLDABLE REFLECTOR

BACKGROUND OF THE INVENTION

The present invention relates generally to foldable dish reflectors and, more particularly, to light weight foldable parabolic reflectors for use with radio frequency antenna assemblies and in other applications where portability is important. Such structures are advantageously used in conjunction with ground reception from satellites in mobile and portable communication applications.

In the past, attempts have been made to provide different forms of lightweight foldable or easily transportable antenna structures for a variety of applications. For example, U.S. Pat. No. 3,715,760 shows a collapsible dish structure utilizing a number of petal assemblies circumferentially attached to a base. A set of springs are used to deploy the petal assemblies to open positions upon the severing of a constraining band. This type of structure is typical of reflectors intended for use in space in the absence of gravitational and other forces. It includes no means for structurally fixing the petal assemblies in the open position and no provision for permitting the structure to be easily refolded to its closed position.

U.S. Pat. No. 3,360,798 shows leaf springs used to deploy a collapsible reflector assembly in spacecraft operations. The springs bias the reflector towards the open position. Latching tabs and a retaining band must be used to hold the reflector in the initial closed position with each rib folded in half. This design is not practical for portable, terrestrial applications; the springs do not provide fixed structural integrity in the presence of gravity or winds, and there is no apparent practical way to refold such a structure in the field.

U.S. Pat. No. 4,608,571 discloses a collapsible parabolic reflector wherein the ribs themselves provide a biasing force which opposes the opening of the reflector. This force, however, is only developed when the reflector is almost completely open and it does not hold the reflector in either an open or closed position. The great number of mechanical elements and couplings in this complex mechanical design tend to make it impractical for applications where easy use, simplicity and reliability are important.

Finally, in a different field, U.S. Pat. No. 2,113,118 discloses a tent with a foldable framework. A series of springs are attached between adjacent arms which are attached to a central hub. In both closed and open positions, the springs act to pull the arms together, with arms above the hub when closed and below the hub when opened. While the weight of the fabric and side supports is adequate to force the legs downward in the open position, the springs are needed to force the hub above the arms. Thus the arms must be rotated open to a position extending down from the hub to avoid a dished configuration which would defeat the whole purpose of the tent by collecting a pool of water in the rain. In view of the differences in objectives and desired operation, the mechanism of this patent is not relevant to reflectors of the type under discussion.

It is an object of this invention to provide light weight parabolic reflectors which are readily transportable and are adapted for ease of opening and closing in field operations, and which may include elastic biased control of rib opening and closing and fixed restraint of ribs in the open position.

It is a further object to provide foldable reflectors which are both simple in form and reliable in spite of repeated openings and closings in the field, and which permit later readjustments of reflector contours by individual rib angle adjustments.

Yet another object of the invention is to provide a foldable reflector having flexible reflective material comprised of individual, replaceable, sector shaped panels which are attached to and extend between adjacent ribs.

SUMMARY OF THE INVENTION

In accordance with this invention, a foldable reflector, able to be readily folded or opened, and having a plurality of rib assemblies pivotable to closed positions forward of a base assembly and pivotable to open positions extending substantially radially from said base assembly, includes a base assembly having a plurality of rib mounting locations arranged around a central axis. Each mounting location has a rib assembly pivot axis and an associated rib stop for limiting pivoting of a rib assembly in the open position. The pivot axes of the rib assemblies define a pivot plane having a forward side to which the rib assemblies fold when closed, and a backside.

The rib assemblies are each pivotally mounted at a pivot axis and are constrained by one of the rib stops so that in the open position each rib assembly lies substantially forward of the pivot plane. Each rib assembly includes a rib portion having at least one longitudinally extending groove and an offset means for providing a bi-stable attachment point. The bi-stable attachment points are positioned forward of the pivot plane when the rib assemblies are in the closed position and are positioned in back of the pivot plane when the rib assemblies are in the open position.

Elastic means, coupled to and extending between the bi-stable attachment points of adjacent rib assemblies bias the rib assemblies towards the closed positions when the foldable reflector is closed and against the rib stops when the foldable reflector is opened.

A plurality of panels of flexible reflective material, each positioned in the longitudinally extending grooves of two adjacent ones of the rib portions are shaped to extend laterally between the ribs for forming a dished reflecting surface when the foldable reflector is opened.

Locking means, rotatably mounted on the base assembly, has radially extending portions which hold the rib assemblies in the open position when the locking means is rotated to a first position. The locking means permits the pivoting of the rib assemblies when it is rotated to a second position.

Overall, the arrangement is such that, when the foldable reflector is opened, the panels of flexible reflective material are laterally extended by the ribs to form a dished reflecting surface.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 5 is a sectional view, from the side of the foldable reflector in the open position.

FIG. 6 is a different sectional view, from the side, with the foldable reflector in the folded position.

FIG. 9 is a cross-sectional view of a rib portion.

FIG. 10 is an illustration of an individual panel of reflective material with an edge bead.

DESCRIPTION OF THE INVENTION

Figure 1:
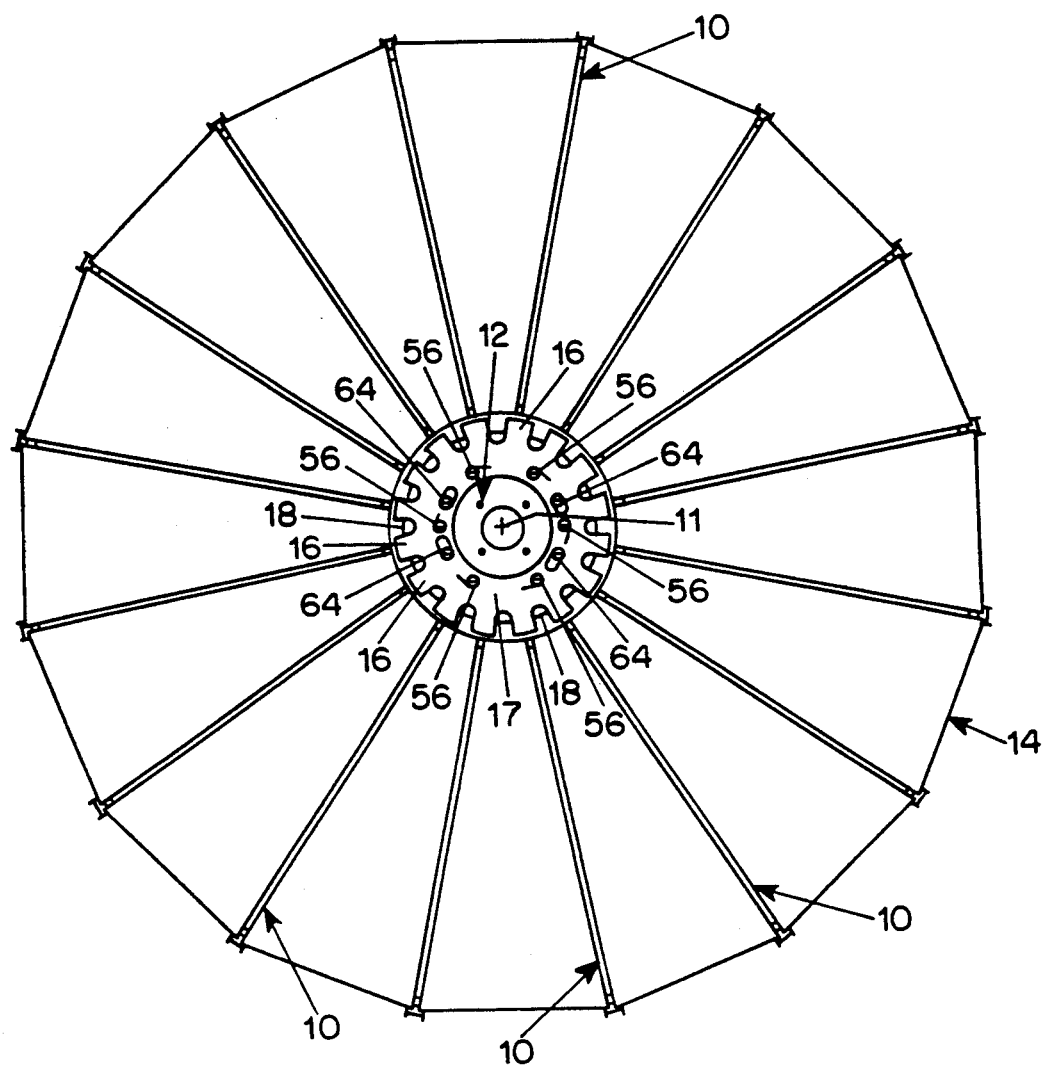
FIG. 1 is a view from a point forward of a foldable reflector according to the present invention, with the reflector in the open position.
Figure 2:
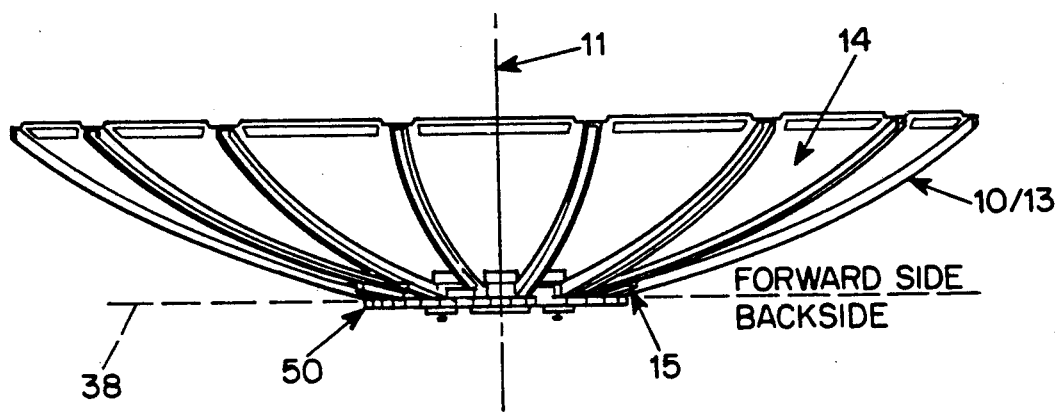
FIG. 2 is a side view of the foldable reflector.
Figure 3:
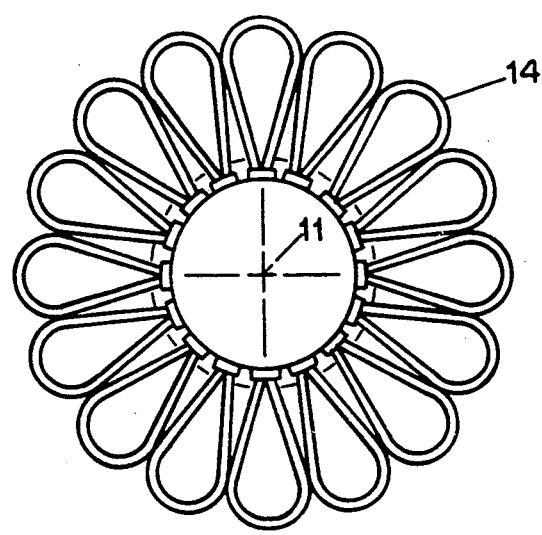
FIG. 3 is a front view of the foldable reflector in the folded position.
Figure 4:
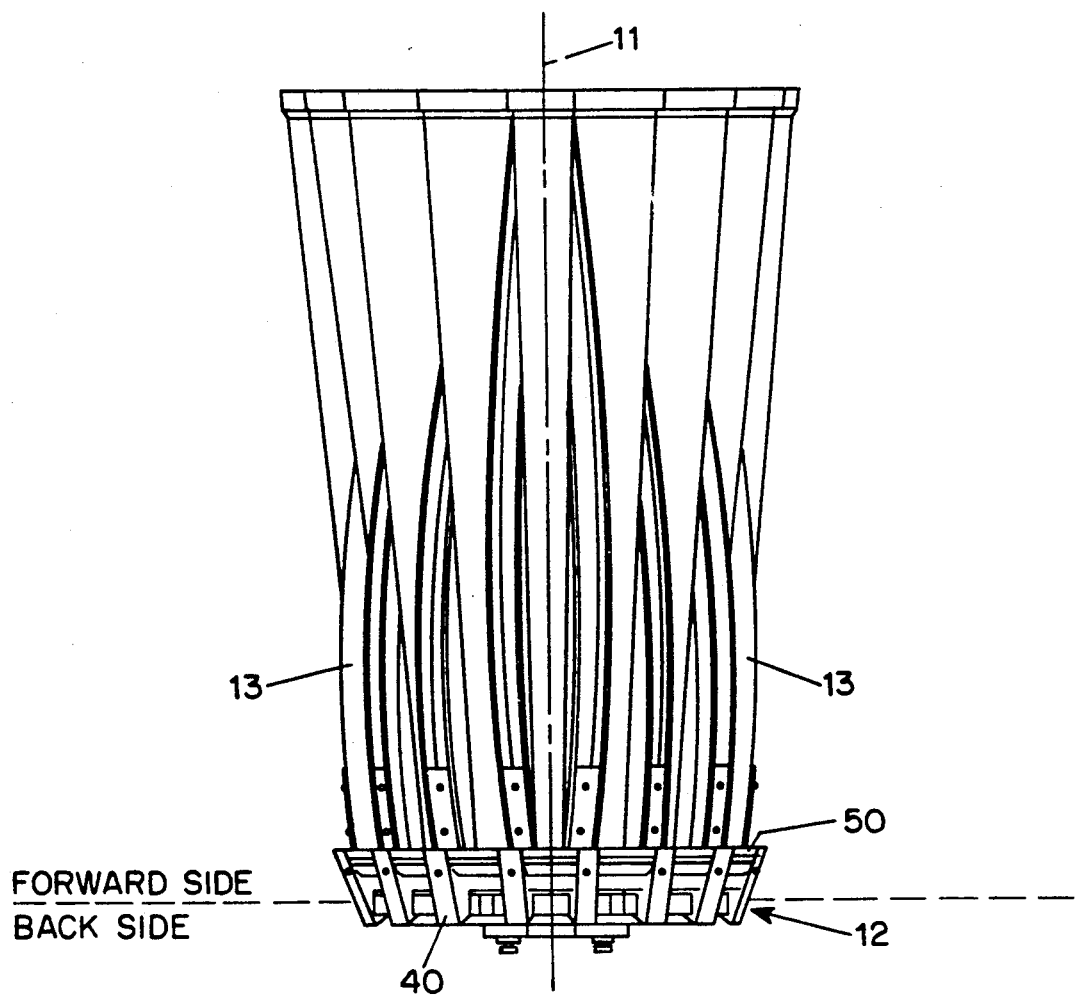
FIG. 4 is a side view of the foldable reflector in the folded position.

FIGS. 1 and 2 show front and side views respectively of a foldable reflector assembly in accordance with the present invention. A plurality of rib assemblies 10 are mounted to a base assembly 12 around the base assembly's central axis 11. The rib assemblies are mounted for pivotal movement between a closed position, where the ribs extend forward from the base assembly, to an open position where the ribs extend substantially axially away from the base assembly. The open position of the rib assemblies is illustrated in FIGS 1 and 2 while FIGS. 3 and 4 show front and side views respectively of a reflector with rib assemblies in the closed position.

Referring back to FIGS. 1 and 2, flexible reflective material 14 is attached to and extends laterally between adjacent ribs to form a dished reflecting surface when the ribs are in the open position.

A lock-plate 17 is rotatably mounted on the base assembly 12. Lock-plate 17 has a series of radially extending portions 16. As shown in FIG. 1, the lock-plate is in a first position of rotation in which the radially extending portions 16 are aligned with the ribs. In this position, the radially extending portions obstruct the pivoting of the ribs and thereby lock the ribs in the open position. The lock-plate 17 can be rotated to a second position of rotation wherein the spaces 18, between the radially extending portions 16, align with the rib assemblies 10. This allows the rib assemblies to move between the closed and open position.

Two different sectional views of the base assembly 12 are shown in FIGS. 5 and 6. Rib assembly 10, in FIG. 5, is in the open position, whereas rib assembly 10 in FIG. 6 is in the closed position. The base assembly 12 includes a bottom plate 20, a central hub 22, a bottom rib plate 24, a top rib plate 26 and the rotatable lock-plate 17. The bottom plate and the rib plates are held together by a set of bolts 30 and nuts 32. As shown in FIG. 5, the bottom rib plate 24 has tabs 34 which curl upwards from the plate to provide rib mounting locations, as will be further described. Looking at FIG. 6, it can be seen that the top rib plate has tabs 36 which curl downward from the plate to provide additional rib mounting locations.

Figure 7:
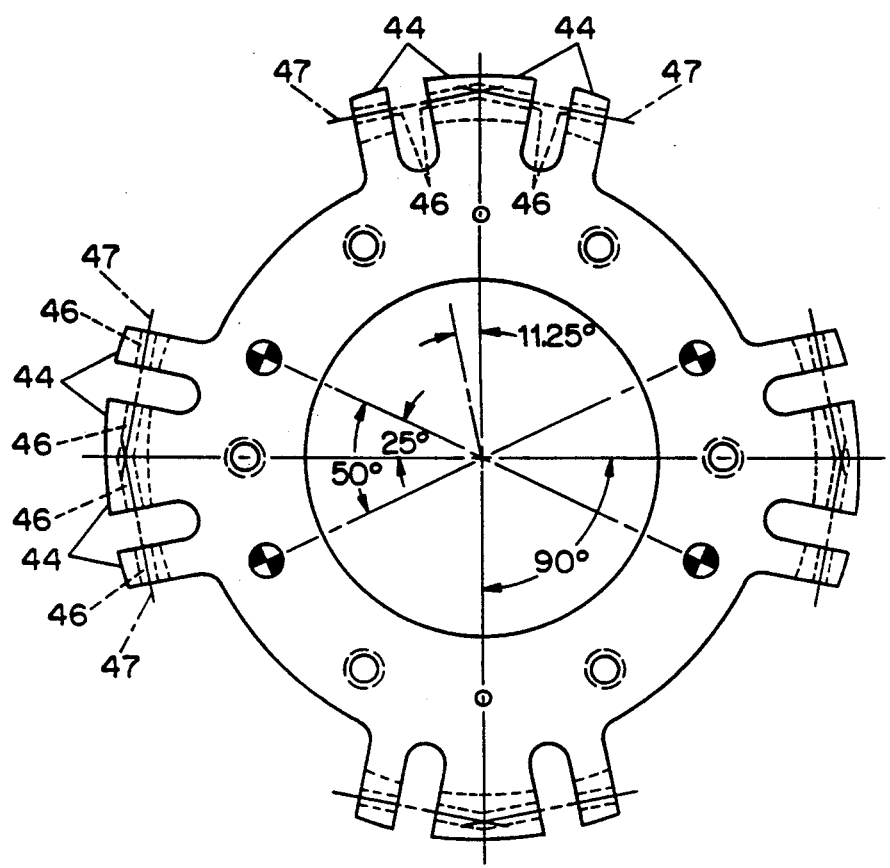
FIG. 7 is a drawing of the top rib plate of the foldable reflector base assembly.
Figure 8:
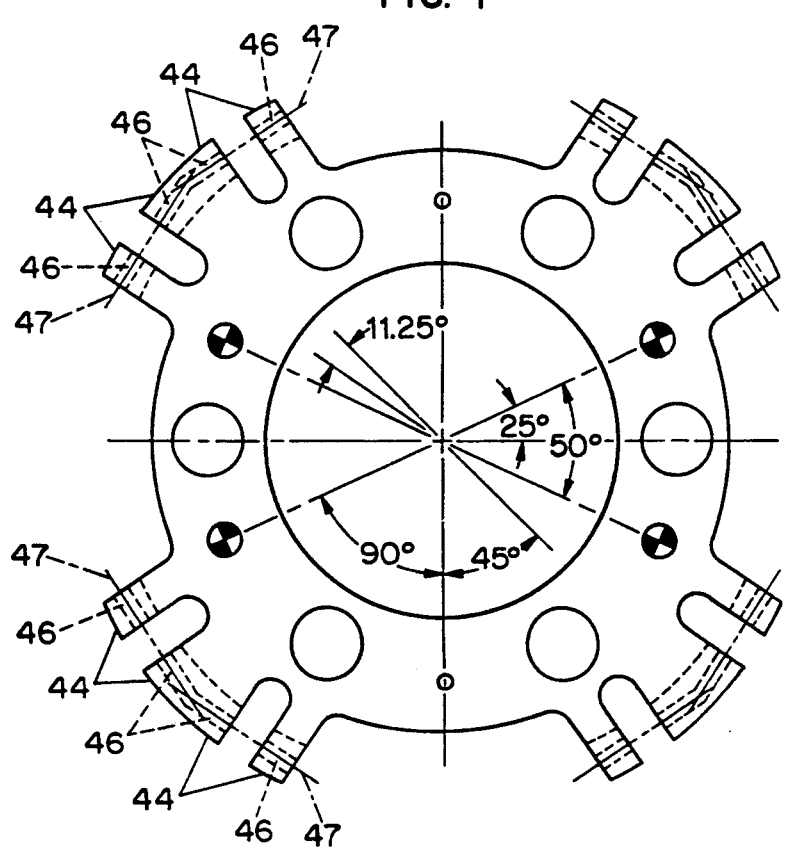
FIG. 8 is a drawing of the bottom rib plate of the foldable reflector base assembly.

The structure of the rib plates can be better understood with reference to FIGS. 7 and 8 which are front views of the top and bottom rib plates respectively. Each plate has eight rib mounting locations defined by pairs of tabs 44 with aligned transverse bore holes 46 each defining a rib assembly pivot axis (the contiguous ones of tabs 44 being shown as joined along their common edge). The rib mounting locations of the top rib plate are offset by 45° from the rib mounting locations of the bottom plate. When the two plates are positioned on top of one another they provide a total of 16 rib mounting locations evenly spaced 22.5° apart. As shown in FIGS. 5 and 6, the tabs 36 of the top rib plate curl downward and those of the bottom plate upward so that the rib assembly pivot axes at all of the mounting locations are at the same level with respect to the central axis 11. Thus the pivot axes around which the rib assemblies pivot, i.e., the axes 47 of the bore holes 46, are substantially coplanar so as to define a "pivot plane" which is indicated in side view in FIGS. 5 and 6 by dashed line 38.

As shown in FIGS. 5 and 6 the rib assemblies 10 are comprised of rib portions 13 mounted to offset members shown as offset brackets 40 which are pivotally mounted to the rib plates at the rib mounting locations by pins 42 which pass through bore holes 46 and the offset brackets. The pins 42 thus provide the pivot axes about which the rib assemblies pivot between open and closed positions. It should be noted that FIGS. 5 and 6 show two adjacent rib assemblies, so as to provide two different cross-sections of the base assembly. The rib portions 13 of the rib assemblies 10, particularly as shown in FIG. 2, are of a substantially parabolic shape such that they form a parabolic surface in conjunction with the flexible reflective material when the rib assemblies are in the open position. Each rib portion 13 is fastened to an offset bracket which is in turn pivotally mounted at a rib mounting location as shown in FIGS. 5 and 6.

As shown in FIGS. 5 and 6, whether the rib assemblies are in open or closed positions they always lie substantially above line 38, this being defined as the "forward", direction as indicated. Thus, the forward side of the pivot plane is the top side in FIGS. 5 and 6. The other side is defined as the "back side". In both the open and closed positions, the ribs extend on the forward side of the pivot plane.

The offset brackets 40, have attachment points shown as notches 48 in FIGS. 5 and 6. The offset brackets are designed so that when the rib assemblies are in the open position, the attachment points extend to the back side of the pivot plane 38 as shown in FIG. 5, and when the rib assemblies are in the closed position, the attachment points extend to the front side of the pivot plane 38 as shown in FIG. 6. This result is accomplished with the invention, even though the rib portion 13, of each rib assembly 10, remains on the forward side of the pivot plane 38 whether the foldable reflector is opened or closed. In the embodiment shown in FIG.5, a small part of the lower corner or the rib portion 13 does extend below the pivot plane, however, the rib portion 13 as a whole is essentially completely forward of the pivot plane 38 even in this position. Offset bracket 40, by comparison, has portions extending both forward and in back of the pivot plane 38 at all times.

Elastic means, such as a circular spring 50, is coupled to and extends between the attachment points of the offset brackets 40 of adjacent rib assemblies. As shown in FIGS. 5 and 6, the spring 50 is coupled by merely being set in the notches 48 and held in place by tension. In other embodiments it may be desirable to use more secure means of attachment.

As shown in FIG. 5, the notches 48 carry the spring to the back side of the pivot plane 38 when the rib assemblies 10 are in the open position. Similarly, FIGS.

2 shows the spring 50 being carried to the back side of the pivot plane 38. In this position, the constraining force of the spring 50, operative at the back side of the pivot plane biases the rib portions 13, remaining on the forward side of the pivot plane 38, to the open position, while the offset means shown as offset brackets 40 contact rib stops 15 in back of the pivot plane.

As shown in FIGS. 4 and 6, when the rib assemblies are in the closed position, the notches 48 carry the spring 50 to the forward side of the pivot plane 38. In this position, the constraining force of the spring biases the rib assemblies 10 towards the closed position.

Thus the reflector is bi-stable in that the spring 50 is effective to alternatively bias the rib assemblies 10 towards the open position when it is on the forward side of the pivot plane and towards the closed position when it is on the back side. While in the preferred embodiment, a single spring set in notches 48, serves as the elastic means, a variety of other devices can be used. For example, the spring can be replaced by a rubber band. Furthermore, the elastic means does not have to be a single circular member, individual elastic means, such as springs, attached to and extending between the attachment points of adjacent rib assemblies would serve the same purpose.

As shown in FIG. 5, while in the open position, the pivotal inclination of each rib assembly 10 can be adjusted by set screws 52 and 54 which are located in the mounting brackets. Set screw 52 acts against rib stop 15, the vertical edge of the bottom plate, while set screw 54 acts against the lower surface of a radially extending portion 16 of lock-plate 17. By individually adjusting the pivotal inclination of the rib assemblies, the uniformity of the reflecting surface may be adjusted.

Lock plate 17 is held to the other components of the base assembly by spring loaded bolt assemblies 56, as shown in FIG. 6. There are six of these bolt assemblies which are located as indicated in FIG. 1. Referring back to FIG. 6, the bolt assemblies 56, as illustrated, include thumb screw 58, spring 60 and nut 62. When thumb screw 58 is loosened, the lock plate 17 is raised by the springs 60. The lock plate 17 can then be rotated between the first and second positions of rotation. Four mounting assemblies 64 can be used to mount the foldable reflector to a stand or a transceiver. Their locations are indicated in FIG. 1. Other mechanical details and arrangements for holding lock plate 14 in the desired position may be utilized by those skilled in the field once the invention is understood.

A cross section of a rib portion 13 of a rib assembly 10 is shown in FIG. 9. In this embodiment, each rib portion has two longitudinally extending grooves 64, which open on the forward side of the rib portion 13 which faces away from the pivot plane when the rib assemblies are in the open position. The grooves 64 are sized to accommodate edge beads of individual sector shaped panels of flexible material. An individual sector shape panel 66 with edge bead 68 is shown in FIG. 10. The edge fold 76 holds the middle portion of the edge bead 68. The edge beads 68 of each panel are inserted in grooves 64 of adjacent rib portions 13 on top of the longitudinal edges 70 of each panel as shown in FIG. 9. This mechanically attaches the panels 66 to the rib portions 13, along their length, and permits the simple removal of any of the individual panels if they need to be replaced. The edge beads 68 are elastically deformable so that they can be pressed through the narrow openings of the grooves 64. Suitable clips inserted at both ends of the longitudinal grooves of each rib portion are used to retain the ends of the individual sector shaped panels 64. The panels 66 are sized and shaped such that they extend laterally between adjacent rib portions 13 in the open position to form a substantially parabolically dished reflecting surface. The flexible reflective material is preferably a polyester knitted fabric plated with a metal coating. Ideally the material is stretchable, particularly in the direction indicated in FIG. 10 by arrows 72.

Figure 11:
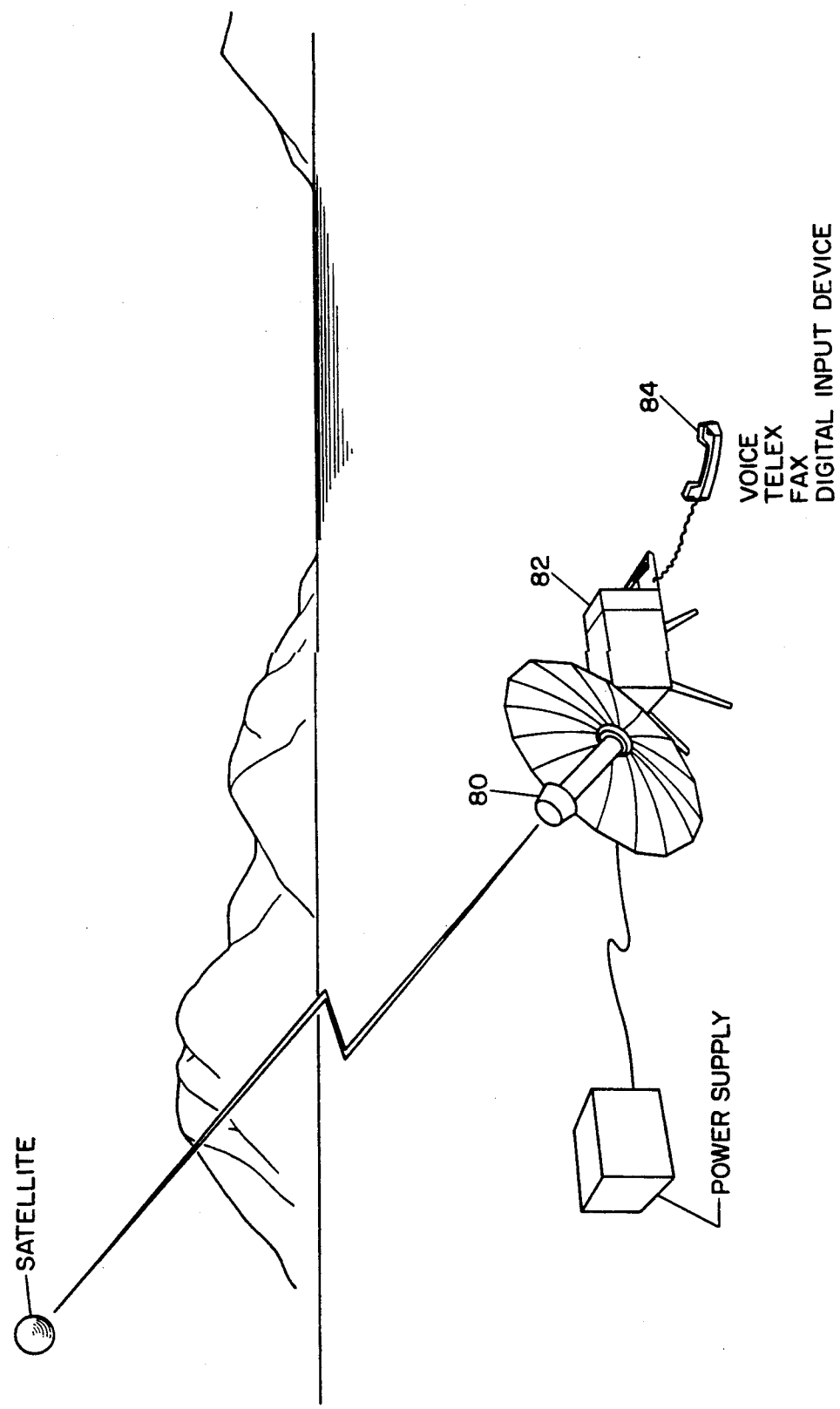
FIG. 11 shows a foldable reflector in a typical application.

In a typical application as shown in FIG. 11, a foldable reflector in accordance with the invention is used in a portable satellite telephone system. As illustrated, satellite signals are coupled to and from the reflector via feed arrangement 80. The complete system includes transceiver 82 and telephone instrument 84. Telex, fax and digital input devices are also included. The complete system is readily transported, set up and folded, permitting ease of use at almost any location. In other applications, foldable reflectors in accordance with the invention may be used to reflect solar energy, sound waves, or as otherwise desired.

While there have been described what are believed to be the preferred embodiments of the invention, those skilled in the art will recognize that other and further modifications may be made thereto without departing from the invention and it is intended to claim all such changes and modifications as fall within the scope of the invention.

We claim:

1. A foldable reflector, able to be readily folded or opened, and having a plurality of rib assemblies pivotable to closed positions forward of a base assembly and pivotable to open positions extending substantially radially from said base assembly, comprising:

a base assembly having a plurality of rib mounting locations arranged around a central axis, each said mounting location having a rib assembly pivot axis and an associated rib stop for limiting pivoting of a rib assembly in said open position, the pivot axes of said plurality of rib assemblies defining a pivot plane having a forward side to which said rib assemblies fold when closed and a back side;

a plurality of rib assemblies each pivotally mounted at one of said pivot axes and constrained by one of said rib stops so that in said open position each said rib assembly lies substantially forward of said pivot plane, each rib assembly including a rib portion having at least one longitudinally extending groove and an offset means for providing a bi-stable attachment point which is positioned forward of said pivot plane when said rib assembly is in said closed position and positioned in back of said pivot plane when said rib assembly is in said open position;

a plurality of panels of flexible reflective material, each positioned in said longitudinally extending grooves of two adjacent ones of said rib portions and shaped to extend laterally between said rib portions for forming a dishing reflecting surface when said foldable reflector is opened;

elastic means, coupled to and extending between said bi-stable attachment points of adjacent rib assemblies for biasing said rib assemblies towards the closed positions when said foldable reflector is closed and for biasing said rib assemblies against said rib stops when said foldable reflector is opened; and locking means, rotatably mounted on said base assembly and having radially extending portions, for holding said rib assemblies in said open position when said locking means is rotated to a first position and for permitting pivoting of said rib assemblies when said locking means is rotated to a second position.

2. A foldable reflector according to claim 1 wherein said rib portion of each rib assembly is parabolically shaped such that the reflective material forms a substantially parabolically dished surface when said rib assemblies are in the open position.

3. A foldable reflector according to claim 1 further comprising means for adjusting the pivotal inclination of each of said rib assemblies when said rib assemblies are in the open position.

4. A foldable reflector according to claim 1 wherein said flexible reflective material is a polyester knitted fabric with a metallic coating.

5. A foldable reflector according to claim 1, wherein each of said offset means comprises an offset bracket pivotally mounted to said base assembly at one of said mounting locations and the rib portion of each rib assembly is fixed to one of said offset brackets.

6. A foldable reflector, able to be readily folded or opened, and having a plurality of rib assemblies pivotable to closed positions forward of a base assembly and pivotable to open positions extending substantially radially from said base assembly, comprising:
a base assembly having a plurality of rib mounting locations arranged around a central axis, each said mounting location having a rib assembly pivot axis and an associated rib stop for limiting pivoting of a rib assembly in said open position, the pivot axes of said plurality of rib assemblies defining a pivot plane having a forward side to which said rib assemblies fold when closed and a back side;
a plurality of rib assemblies each pivotally mounted at one of said pivot axes and constrained by one of said rib stops so that in said open position each said rib assembly lies substantially forward of said pivot plane, each rib assembly including a rib portion and an offset means for providing a bi-stable attachment point which is positioned forward of said pivot plane when said rib assembly is in said closed position and positioned in back of said pivot plane when said rib assembly is in said open position;
flexible reflective material coupled to said rib portions and shaped to extend laterally between said rib portions for forming a dished reflecting surface when said foldable reflector is opened;
elastic means, coupled to and extending between said bi-stable attachment points of adjacent rib assemblies for biasing said rib assemblies towards the closed positions when said foldable reflector is closed and for biasing said rib assemblies against said rib stops when said foldable reflector is opened.

7. A foldable reflector according to claim 6 wherein each of said rib portions is parabolically shaped such that said flexible reflective material forms a parabolically dished surface when said foldable reflector is opened.

8. A foldable reflector according to claim 6 further comprising means for adjusting the pivotal inclination of each of said rib assemblies when said rib assemblies are in said open position.

9. A foldable reflector accord to claim 6 wherein said flexible reflective material is a polyester knitted fabric with a metallic coating.

10. A foldable reflector according to claim 6 wherein said flexible reflective material is comprised of a plurality panels which are coupled to adjacent rib portions and are shaped to laterally extend between adjacent rib portions for forming a dished reflecting surface when said foldable reflector is opened.

11. A foldable reflector according to claim 10 wherein said rib portions have at least one longitudinally extending groove and wherein each of said panels of flexible reflective material is positioned in said longitudinally extending grooves of two adjacent rib portions, so as to extend laterally between said rib portions when said rib assemblies are in said open position.

12. A foldable reflector according to claim 6, wherein each of said offset means comprises an offset bracket pivotally mounted to said base assembly at one of said mounting locations and the rib portion of each rib assembly is affixed to one of said offset brackets.

13. A foldable reflector, able to be readily folded or opened, and having a plurality of rib assemblies pivotable to closed positions forward of a base assembly and pivotable to open positions extending substantially radially from said base assembly, comprising:
a base assembly having a plurality of rib mounting locations arranged around a central axis, each said mounting location having a rib assembly pivot axis and an associated rib stop for limiting pivoting of a rib assembly in said open position, the pivot axes of said plurality of rib assemblies defining a pivot plane having a forward side to which said rib assemblies fold when closed and a back side;
a plurality of rib assemblies each pivotally mounted at one of said pivot axes and constrained by one of said rib stops so that in said open position each said rib assembly lies substantially forward of said pivot plane;
flexible reflective material coupled to said rib assemblies and shaped to extend laterally between said rib portions for forming a dished reflecting surface when said foldable reflector is opened;
locking means, rotatably mounted on said base assembly and having radially extending portions, for holding said rib assemblies in said open position when said locking means is rotated to a first position and for permitting pivoting of said rib assemblies when said locking means is rotated to a second position.

14. A foldable reflector according to claim 13 wherein each of said rib assemblies includes a rib portion parabolically shaped such that the reflective material forms a parabolically dished surface when the foldable reflector is opened.

15. A foldable reflector according to claim 13 further comprising means for adjusting the pivotal inclination of each of said rib assemblies when said rib assemblies are in the open position.

16. A foldable reflector according to claim 13 wherein said flexible reflective material is a polyester knitted fabric with a metallic coating.

17. A foldable reflector according to claim 13 wherein said flexible reflective material is comprised of a plurality panels which are coupled to adjacent rib assemblies and are shaped to laterally extend between adjacent rib assemblies for forming a dished reflecting surface when said foldable reflector is opened.

18. A foldable reflector according to claim 17 wherein each of said rib assemblies includes a rib portion having at least one longitudinally extending groove and wherein each of said panels of flexible reflective material is positioned in said longitudinally extending grooves of two adjacent rib portions, so as to extend laterally between said rib portions when said rib assemblies are in said open position.

* * * * *